United States Patent
Hughes et al.

(10) Patent No.: US 6,267,887 B1
(45) Date of Patent: *Jul. 31, 2001

(54) SHOWER FILTER FOR CHLORINE REMOVAL AND SCALE DEPOSIT PREVENTION

(76) Inventors: Douglass E. Hughes, 3457 Iris Ct., Boulder, CO (US) 80303; Rich E. Buhler, 2193 Sandollar Cir., Longmont, CO (US) 80503

( * ) Notice: Subject to any disclaimer, the term of this patent is extended or adjusted under 35 U.S.C. 154(b) by 0 days.

This patent is subject to a terminal disclaimer.

(21) Appl. No.: 09/489,762

(22) Filed: Jan. 24, 2000

Related U.S. Application Data

(63) Continuation-in-part of application No. 08/988,866, filed on Dec. 11, 1997, now Pat. No. 6,096,197.

(51) Int. Cl.[7] .................................................. B01D 27/14
(52) U.S. Cl. ......................... 210/266; 210/282; 210/443; 210/449
(58) Field of Search .................................... 210/232, 266, 210/282, 315, 440, 443, 449, 460, 697, 490, 503; 4/615; 137/801

(56) References Cited

U.S. PATENT DOCUMENTS

| | | | |
|---|---|---|---|
| 3,430,769 | * 3/1969 | Sanzenbacher | 210/266 |
| 3,469,696 | 9/1969 | Petrucci et al. | 210/97 |
| 3,853,761 | 12/1974 | McClory | 210/100 |
| 3,950,251 | * 4/1976 | Hiller | 210/232 |
| 4,686,037 | 8/1987 | Lang | 210/221.2 |
| 4,753,728 | 6/1988 | VanderBilt et al. | 210/282 |
| 4,770,768 | 9/1988 | Lang | 210/94 |
| 4,804,476 | * 2/1989 | Sinkovitz et al. | 210/697 |
| 5,008,011 | 4/1991 | Underwood | 210/232 |
| 5,108,709 | 4/1992 | Bugar et al. | 422/101 |
| 5,114,570 | 5/1992 | Nelson et al. | 210/94 |
| 5,137,657 | 8/1992 | Boffardi | 252/387 |
| 5,152,464 | 10/1992 | Farley | 239/553.3 |
| 5,545,314 | 8/1996 | Parise et al. | 210/100 |
| 5,653,868 | 8/1997 | Yanou et al. | 210/232 |
| 5,795,471 | 8/1998 | Naito | 210/223 |
| 6,096,197 | * 8/2000 | Hughes | 210/94 |

* cited by examiner

Primary Examiner—Joseph W. Drodge
(74) Attorney, Agent, or Firm—Sarah S. O'Rourke; Steven C. Peterson; Hogan & Hartson, LLP

(57) ABSTRACT

Embodiments of a multi-purpose, replaceable shower/tub filter cartridges are shown and described, the filter cartridges including a carbon block for chlorine removal and a scale-inhibitor media contained in a space inside the carbon block. The filter cartridges are adapted for use in shower/tub filter units. One embodiment of a filter cartridge of this invention is asymmetrical and bi-directional filter cartridge having aperatured end caps on each end of the filter cartridge, such that it can be inserted into the filter housing with either end in an upward orientation to make installation trouble-free. In an alternative embodiment, the filter cartridge is unidirectional and has a closed end and an aperatured end. The closed end of the unidirectional filter cartridge may be a closed end cap, or may be achieved by fabricating the carbon block to have a closed end and an open end. The unidirectional filter cartridge in inserted in the filter unit with open end near the outlet port of the filter unit. The unidirectional filter cartridge is designed to ensure that the filter cartridge will be inserted correctly by the user.

14 Claims, 8 Drawing Sheets

SHOWER FILTER FOR CHLORINE REMOVAL AND SCALE DEPOSIT PREVENTION

RELATED APPLICATIONS

This application is a Continuation-in-Part of U.S. patent application Ser. No. 08/988,866, filed Dec. 11, 1997, now U.S. Pat. No. 6,096,197, and entitled "Shower Filter for Chlorine Removal and Scale Deposit Prevention."

BACKGROUND OF THE INVENTION

1. Field of the Invention

This invention relates generally to filters for purifying or treating shower water. More specifically, this invention relates to a shower filter that removes chlorine and also treats components that cause scaling in the shower environment.

2. Related Art

Over the past ten years North American consumers in particular have become aware of problems with their municipally-treated tap water. Specifically, there is growing concern about chlorine in tap water. Studies now have shown that chlorine, in contact with organics, forms trihalomethanes (THMs), which in turn are responsible for some cancers in humans. As the awareness of the problem of chlorinated water grows, consumers seek remedies. At the kitchen tap, these remedies are manifested in the purchase of bottled water, the growing popularity of carafes that de-chlorinate water, and end-of-tap and under-counter devices that de-chlorinate water.

Studies are now beginning to show that humans can consume large amounts of chlorine in the shower. Chlorine by nature is a gas, and in the form of a hot water spray such as a shower, the chlorine is highly unstable and almost instantly coverts to a gas. The person taking a shower then inhales this chlorine gas. One study asserts that chlorine inhaled in one shower is equivalent to drinking 50 gallons of chlorinated tap water. It is not known how harmful the inhalation of this chlorine gas can be. Whereas twenty years ago there was no evidence that chlorinated tap water was carcinogenic, today it is proven and accepted. Thus, there is a grave concern among the health-conscious consumers that the in-take of any chlorine in any form could be harmful.

Another problem with shower water is scale in the water, also known as "hard water". Scale or hard water are layman's terms for the presence of calcium and magnesium. These two common ingredients are present in 75% of all American household tap water. Scale is harmless to our health, but aesthetically unpleasing. Typically, hard water or scale forms a white crust around the spray holes in the showerhead, causing the showerhead to degrade over time. The scale is also unsightly when it sticks to surfaces such as shower walls or doors. Even ceramic tile is not immune to the build-up of scale. Scale is a particular problem on walls since it provides a surface area for the growth of bacteria. The combination of a moist environment and the rough surface of a scaley tiled wall is perfect for bacteria and algae growth. Today most bathroom cleansers will assert that they attack or remove scale deposits as well as clean, but these remedies are only partially effective.

Another problem with shower water is fine sediment. Tap water, such as municipally treated water or well water, typically has fine sediment which is often invisible but which over time will clog a water filter and thus reduce the flow of water through the filter prematurely.

Another problem with designing products for the bathroom, especially the tub/shower area, is that the configuration accepted as standard in the United States differs greatly from the configurations in the rest of the world. In Canada, Asia and Europe, the connection for the showerhead is down at the tub faucet instead of six feet higher as in the United States.

In the past, shower filters have been made that feature coarse granular carbon for chlorine removal. Carbon block has been used in radial flow for chlorine removal, but the carbon block core has been left empty and used solely for conducting water.

Therefore, there is still a need for a device that effectively removes chlorine from tap water such as shower or bath water, and that also treats the components of the water stream that cause scale deposits. There is also a need for a device that effectively removes fine sediment from tap water wherein the device does not clog prematurely and therefore does not reduce the flow of water through the device. There is a need for an economical shower filter device that can be adapted to the wide variety of plumbing and shower configurations that are used in the world.

SUMMARY OF THE INVENTION

Accordingly, it is a general object of the present invention to provide a single device that effectively removes chlorine from tap water such as shower or bath water, and that also treats the components of the water stream that cause scale deposits.

It is a further object of the present invention to provide a single device that, in addition to effectively removing chlorine from tap water and treating components of the tap water that cause scale deposits, also filters fine sediment from the water.

To achieve the foregoing and other objects and in accordance with the purposes of the present invention, as embodied and broadly described herein, this invention comprises multi-purpose, replaceable shower/bath filter cartridges designed to reduce chlorine in tap water through adsorption, and further designed to reduce or eliminate scale deposits. The replaceable filter cartridges of this invention may also be designed to reduce or eliminate fine sediment in tap water. One embodiment of this invention comprises a filter unit comprising a replaceable filter cartridge of this invention contained within a housing of the filter unit, wherein the filter unit fits easily in both U.S. and European-style bathroom plumbing configurations, and wherein the design of the filter unit keeps the filter unit from significantly lowering the level of the showerhead from its original level, that is, the distance of the showerhead from the shower or bath floor. An additional feature of this invention is that the filter units of this invention are designed for quick, tool-free replacement of the invented replaceable filter cartridges.

In one embodiment of this invention, the filter cartridge contained within a filter unit is symmetrical and bidirectional, that is, the filter cartridge is designed so that either end of the symmetrical, bidirectional filter cartridge may be inserted into the housing of the filter unit. In another embodiment, the filter cartridge contained within a filter unit is a unidirectional filter cartridge which is closed at one end and opened at the other end, and the unidirectional filter cartridge is inserted in the housing of the filter unit with the opened end of the unidirectional filter cartridge disposed at the outlet end of the filter unit.

An additional feature of the invention is that the mesh size of the activated carbon powder used to fabricate the filter cartridges of this invention may be configured to accommodate differing water pressures. Yet another feature of this invention is that the filter cartridges of this invention may comprise a modified carbon block comprising fibrous material capable of trapping fine sediment without becoming clogged prematurely.

Additional objects, advantages, and novel features of the invention shall be set forth in part in the description that follows, and in part will become apparent to those skilled in the art upon examination of the following or may be learned by the practice of the invention. The objects and the advantages may be realized and attained by means of the instrumentalities and in combinations particularly pointed out in the appended claims.

BRIEF DESCRIPTION OF THE DRAWINGS

The accompanying drawings, which are incorporated in and form a part of the specification, illustrate the preferred embodiments of the present invention, and together with the descriptions serve to explain the principles of the invention.

DESCRIPTION OF THE PREFERRED EMBODIMENTS

This invention provides replaceable filter cartridges for removing chlorine, scale, and fine sediment from tap water, preferably for use as a shower or bath filter. The replaceable filter cartridges of this invention are used in filter units which may be installed between a plumbing pipe of a bath or shower and a shower head. The invented filter cartridges enable a single device to simultaneously prevent scale deposits from forming on plumbing and wall surfaces while also reducing or eliminating the potential health hazard of chlorine from tap water, such as shower spray, and optionally also reduce or eliminate fine sediment from tap water.

Figure 1:
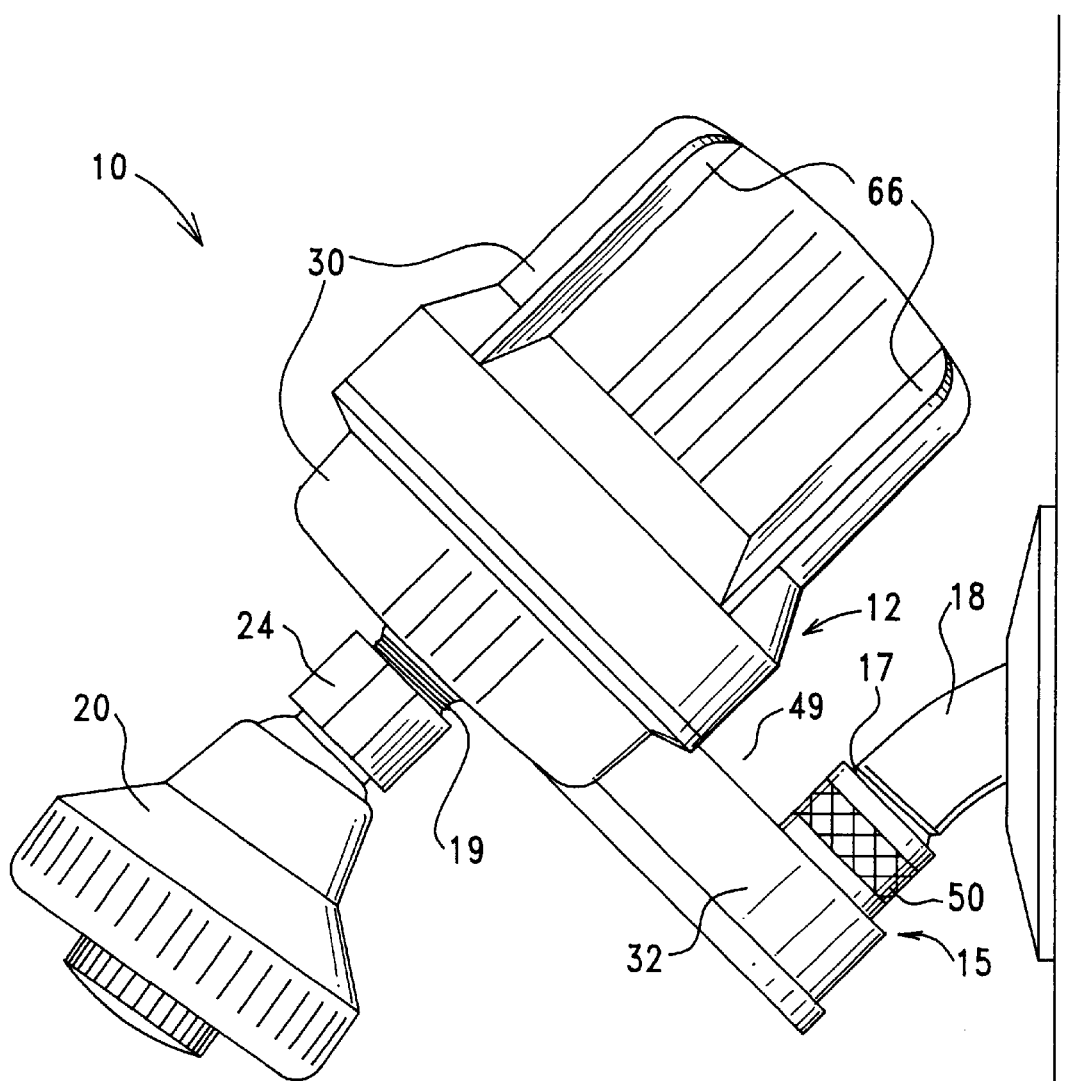
FIG. 1 is a side view of one embodiment of filter unit of this invention, attached to a shower wall water pipe.
Figure 2:
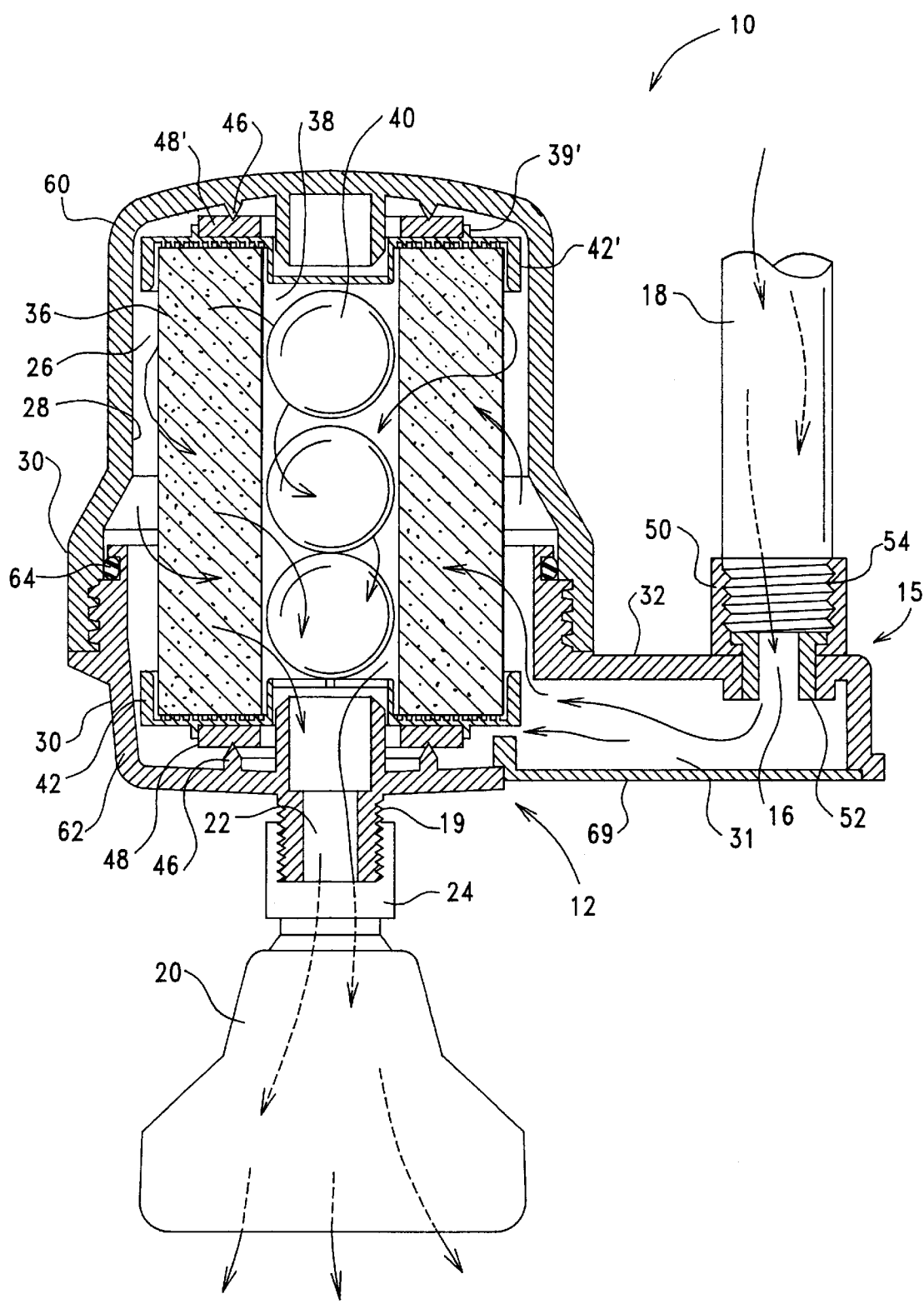
FIG. 2 is a cross-sectional view of one embodiment of FIG. 1, comprising a symmetrical, bidirectional filter cartridge, showing water flow through the filter unit.
Figure 3:
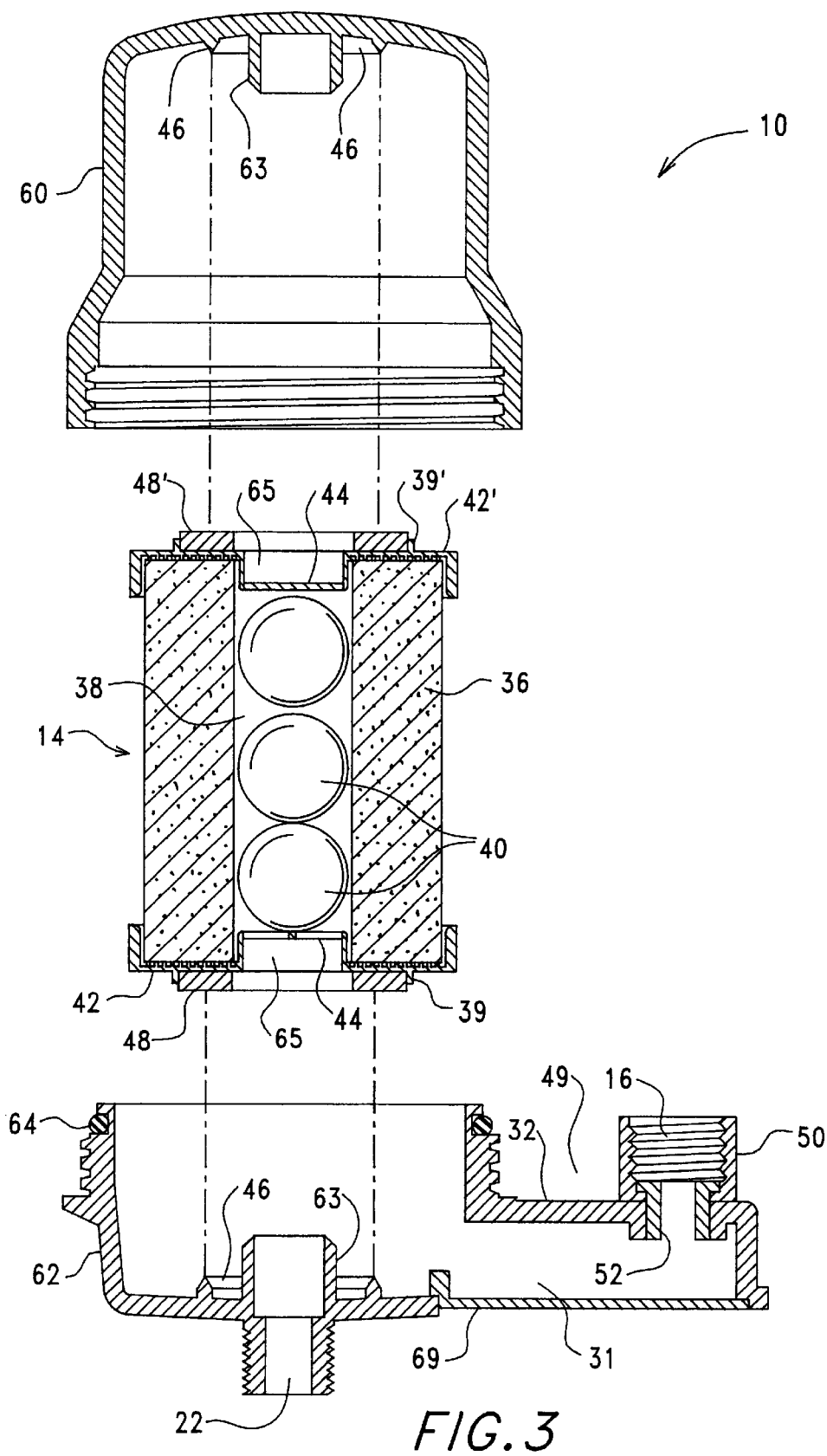
FIG. 3 is an expanded side view of the cross-sectional view of FIG. 2.
Figure 4:
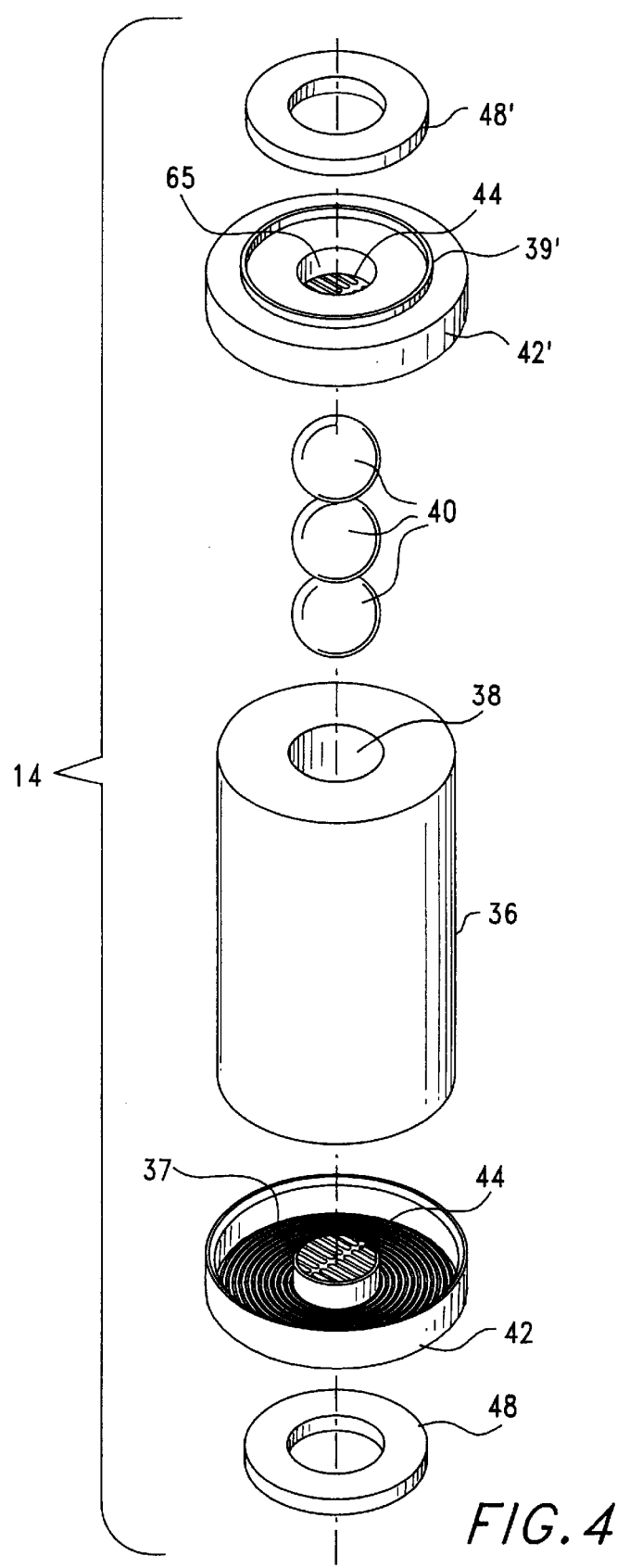
FIG. 4 is an expanded perspective view of the symmetrical, bidirectional filter cartridge of the embodiment of FIG. 2.

Referring now to FIGS. 1–4, one embodiment of this invention comprises a replaceable, symmetrical, bidirectional filter cartridge 14, which may be contained within housing 12 of a filter unit such as filter unit 10 of FIGS. 1–3. The filter unit 10 illustrated in FIGS. 1–3 accomplishes at least three main water treatment and design objectives. First, filter unit 10 comprises a symmetrical, bidirectional filter cartridge 14 which accomplishes the scale-reduction or -prevention by treating water with a specially-designed phosphate-silicate-containing material that treats scale (e.g., calcium and magnesium) in tap water so that the scale will not stick to plumbing or shower or bath surfaces. Second, the symmetrical, bidirectional filter cartridge 14 of filter unit 10 also accomplishes the reduction or elimination of chlorine in the water through the adsorption capabilities of a super-fine mesh powdered activated carbon, formed into a carbon block. Third, the design of filter unit 10 illustrated in FIGS. 1–3 accomplishes a universality objective in that it is designed to fit both U.S. and European-style configurations for bathroom shower/tub units. While being designed to fit under the faucet of a European-style bath/shower, the design of filter unit 10, when placed in a U.S. shower configuration, keeps the filter housing 12 up and behind the showerhead 20 and substantially above the original location of the showerhead 20. Thus, the presence of the filter unit 10 in a U.S. configuration does not noticeably lower the showerhead 20 from its original position, and thereby accommodates taller persons and preserves, in general, the location, direction and pattern of the user's original shower spray.

Referring again to FIGS. 1–3, there is shown one, but not the only, embodiment of the invented shower filter unit 10 comprising symmetrical, bidirectional filter cartridge 14. The shower filter unit 10, herein also called the "filter unit", illustrated in FIGS. 1–3, comprises a housing 12 for containing and directing the flow of water through symmetrical, bidirectional filter cartridge 14. As shown in FIG. 2, the housing 12 is connected at connector 15 around an inlet port 16 of housing arm 32 to pipe end 54 of plumbing pipe 18 exiting the shower/tub wall, or alternatively, to a European-style shower configuration (not shown). The housing 12 is also connected to the showerhead 20 at the connector 19 of housing outlet port 22. Preferably, the inlet port 16 is securely and rigidly screwed onto the threads of plumbing pipe 18 and the connection is further sealed with Teflon™ or other pipe thread tape. The showerhead 20 is preferably connected to the housing 12 much as it would be in a conventional connection to a shower pipe, that it, with a swivel-collar style connection 24 that allows the showerhead 20 to be swivelled relative to the filter unit 10 to the position desired for comfortable use. As shown in FIG. 1, the filter unit 10 is designed such that both the housing arm 32 and outlet port 22 are located at or near the lower end of housing 12. As a result of this design, filter unit 10 may be attached to the pipe end 54 of plumbing pipe 18 so that the filter unit 10 extends substantially up and outward from the end of the pipe 18. In this way, the body 30 of the housing 12 is normally completely above the pipe end 54. This results in the showerhead 20, which extends downward from the housing body 30, terminating only a couple inches below the horizontal level that it normally would be if the filter unit 10 were absent. Thus, the showerhead 20 is only a few inches forward from its original position.

FIG. 2 illustrates the water flow through filter unit 10 comprising a symmetrical, bidirectional filter cartridge 14. Water enters the inlet port 16 (normally at about 160° F.) and then flows through the interior space 31 of the housing arm 32 and into the interior space of the housing body 30, which holds filter cartridge 14. The water flows around the exterior of the filter cartridge 14 in the annular space 26 between filter cartridge 14 and the interior body wall 28, and then flows radially through cylindrical carbon block 36 of filter cartridge 14 into the center core or "bore" 38 of carbon block 36. In the bore 38, the water contacts scale-inhibitor spheres 40 or other scale-inhibitor material received in the bore 38. After contact with the spheres 40, the water is directed through an opening at the bottom of the filter cartridge 14, that is, through the aperatured end cap 42 near the outlet port 22. Exiting the filter unit 10 through the outlet port 22, the water flows to the showerhead 20 and out to the user. Thus, as further explained below, the shower water may flow from its normal source (a pipe or faucet), through the filter unit 10, and out from its normal spraying device (a showerhead or hand-held sprayer).

An important feature of filter unit 10 is that chlorine is effectively removed from tap water. Chlorine is removed from the tap water by the cylinder-shaped carbon block 36 of filter cartridge 14. Carbon block 36 may be manufactured by techniques known in the art of carbon block manufacture. Carbon blocks are superior to granular activated carbon for this use, because they can be made with a much greater surface area than the granular media and do not allow water to channel. Carbon rapidly adsorbs chlorine from water, and, the greater the surface area of activated carbon, the greater its ability to adsorb chlorine. Thus, carbon cannot be evaluated as a filter solely in terms of its weight or mass. Rather, its filtering ability is measured in terms of its surface area. The finest mesh size of granular activated carbon media typically used in loose form is limited to is 20×50, which corresponds to fine granules. This is typically the practical limit to mesh size, because granular media of any finer mesh would literally float away in the air as dust as it was being processed. By contrast, the carbon processed into a carbon block can be ground down to particles as small as 80×325 and even 80×400 mesh. This exceptionally-fine mesh size can be used in carbon block manufacture to provide carbon block surface areas ten times that of 20×50-mesh carbon.

Alternatively, carbon block 36 of filter cartridge 14 may comprise a modified carbon block which, in addition to being able to remove chlorine from water, is capable of trapping fine sediment in tap water through depth filtration. The modified carbon block 36 is preferably fabricated by blending very fine carbon dust with a fibrous material and a binder, and then heating and compressing the blended carbon into a cylindrically shaped block. The modified carbon block thus comprises compact fibers which are able to trap fine particles within the interior of the carbon block, rather than just its surface, which is the situation with conventional carbon blocks. The modified carbon block 36 thus offers depth filtration, that is, the modified carbon block 36 is capable of trapping fine sediment without becoming clogged prematurely, and thus prolongs the time the filter cartridge 14 may be used before the filter cartridge 14 becomes clogged and reduces the flow of water to showerhead 20.

Yet another alternative embodiment of the carbon block comprises a carbon block having an outer sleeve comprising a depth filtration material that is wrapped around the exterior of the carbon block. The outer sleeve may be spun polypropylene, porous plastic, or any powdered polymer that can be sintered during processing to create depth filtration and that may be formed to fit over the exterior of the carbon block.

Another important feature of the filter unit 10 is that it prevents scale from adhering to plumbing surfaces and wall and tile surfaces. This is accomplished by the presence of a scale-inhibitor material, preferably in the form of the small, phosphate-containing spheres 40, for example phosphate-silicate-containing spheres, just under one inch in diameter and contained within the filter cartridge 14. When wet, these scale-inhibitor spheres 40 begin to give off phosphates that treat (i.e., "coat") the scale-forming minerals such as calcium and magnesium present in the water to prevent their deposition as "hard water scale". The scale-inhibitor spheres 40, preferably about 2–4 in number, typically last about six months in normal family use. To provide proper contact between the water and the scale-inhibitor spheres 40 for dissolving phosphates properly in the water, the scale-inhibitor spheres 40 are placed inside the center core 38 of cylindrical carbon block 36 of filter cartridge 14. Referring to FIG. 2, as tap water enters filter unit 10, it first flows through carbon block 36 (thus becoming de-chlorinated) and then enters center core 38, where the de-chlorinated water encounters the scale-inhibitor spheres 40 and must flow around them to continue toward the showerhead 20. This contact between the de-chlorinated water and the scale-inhibitor spheres 40 causes phosphates contained in spheres 40 to dissolve and mix with the de-chlorinated water and treat (i.e., "sequester") the scale-forming minerals contained in the water, thus reducing the scale content in the water. The effluent water exiting filter unit 10 is free of chlorine and the scale has been treated so that it will not stick to any surface. Preferably, the scale-inhibitor spheres 40 are phosphate-containing spheres comprising commercially available hexametaphosphate crystals, or hexametaphosphate/silicate-containing spheres which may be obtained under the "Siliphos" brand name.

The scale-inhibitor spheres 40 are contained in the center core (bore 38) of the carbon block cylinder 36 of symmetrical, bidirectional filter cartridge 14 by aperatured end caps 42, 42'. As shown to best advantage in FIGS. 3 and 4, the aperatured end caps 42, 42' of the filter cartridge 14 preferably have grates 44 or other perforations that allow the water to flow through the end caps but that retain the scale-inhibitor spheres 40 in the bore 38. Water is prevented from bypassing the carbon block 36 and flowing directly through aperatured end cap 42' and into the center core 38 of the block 36, preferably by the positioning of circular protrusions, herein also called "knife edges" 46, which extend axially from each end of the interior of housing body 30 into the interior space of the body. Each knife edge 46 compresses into soft rubber washers 48, 48' affixed to the outer surface of end caps 42, 42', respectively, which washers rests inside retaining rings 39, 39' disposed in end caps 42, 42', respectively. As a result of the bypass prevention provided by knife edges 46 and washer 48 the top of the filter cartridge 14 provides no exit whatsoever, and therefore water entering the bore 38 through carbon block 36 must travel down through the open grate 44 of end cap 42 at the bottom of the filter cartridge 14. This same bottom grate 44 prevents the scale-inhibitor spheres 40 from falling out. Alternative locations for scale-inhibitor media may be included in the scope of this invention, but spheres captured inside a space in the carbon block 36 are the preferred way of providing the scale-inhibitor feature. End caps 42, 42' may include concentric ribs 37 for contacting and sealing with the carbon block 36.

Filter unit 10 accepts a replacement symmetrical, bidirectional filter cartridge 14, and the user can easily replace the cartridge without assistance or tools. Replacement filter cartridge 14 is designed the same as the first cartridge supplied with the filter housing. The symmetrical, bidirectional cartridge 14 is designed with both ends having aperatured end caps 42, 42' with grates 44 and the washers 48, 48' described above for cooperating with the knife-edges to control water flow. Thus, the symmetrical, bidirectional filter cartridge 14 may be installed with either end in either the upward or downward position, and symmetrical, bidirectional filter cartridge 14 seals the same way at either end. In this way, the user cannot install a replacement symmetrical, bidirectional filter cartridge 14 incorrectly, as it has no necessarily up or down end. Although alternative filter media configurations for removing chlorine and preventing scale are included in this invention, the preferred filter cartridge 14 conveniently place the desirable media in a single, easily-handled unit.

As shown in FIGS. 2 and 3, filter unit 10 comprises a generally cylindrical upper portion 60 or "upper sump" of the housing body 30. Upper portion 60 is threaded to lower end 62 to hold filter cartridge 14 in place within housing 12 and to permit removal and replacement of filter cartridge 14 without having to remove filter unit 10 from plumbing pipe 18. The user installs symmetrical, bidirectional filter cartridge 14 by removing upper portion 60 of the housing body 30 by unscrewing it from the lower portion 62 of the body 30. Symmetrical, bidirectional filter cartridge 14 is then removed and a fresh one is replaced in the body to be coaxial with the body, that is, the elongated cylindrical cartridge is aligned to be coaxial with the longitudinal axis of the body. Placement of symmetrical, bidirectional filter cartridge 14 is made easy and sure, because guides 63 protrude from the interior surface of each end of the body and are received in the central recess 65 of each end cap. A dynamic O-ring 64 fits into a groove in the threads of the upper sump 60, and, in this position, does not come out easily even during the repeated detachment and re-attachment of the two portions of the housing body. This feature eliminates a common problem in sumps, that is, the O-ring falls out or worse, it comes loose and then is destroyed when the sump is screwed back into place. This O-ring design makes it nearly impossible for the user to inadvertently dislodge and destroy the O-ring.

This invention further provides a unidirectional filter cartridge comprising a closed end and an opened (aperatured) end opposite the closed end, wherein the unidirectional filter cartridge further comprises a carbon filter media and a scale inhibitor media. Thus, the preferred unidirectional filter cartridge conveniently places the desirable media in a single, easily-handled unit. The unidirectional filter cartridge may be installed in a variety of filter unit designs. The design of the unidirectional filter cartridge requires that the unidirectional filter cartridge be installed in the housing of a filter unit with the opened end of the cartridge positioned at the outlet end of the filter unit to ensure that water entering the filter unit flows radially through the unidirectional filter cartridge.

Figure 5:
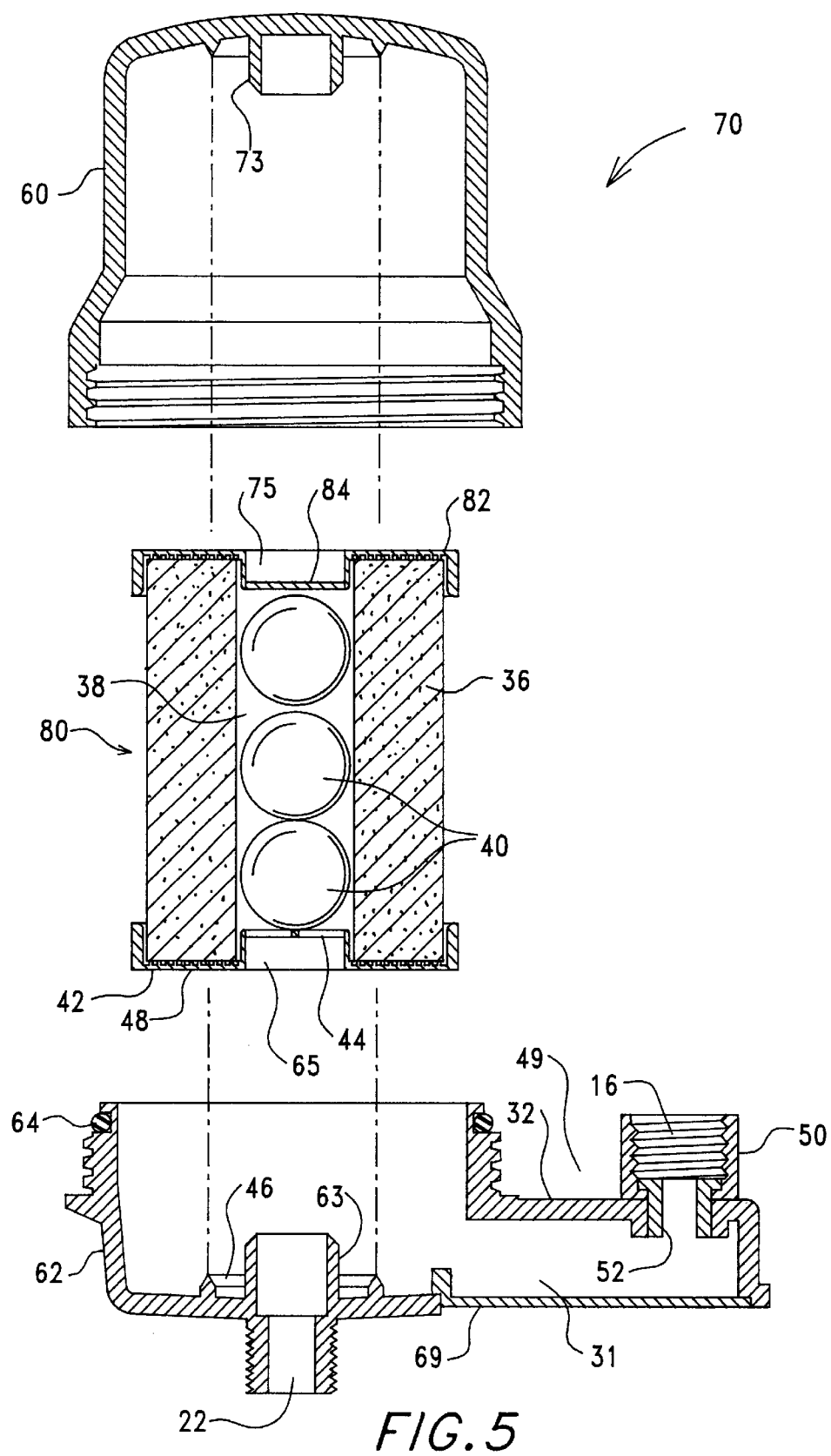
FIG. 5 is an expanded side view of a cross-sectional view of the invented filter unit, comprising a unidirectional filter cartridge having a closed upper end cap.
Figure 6:
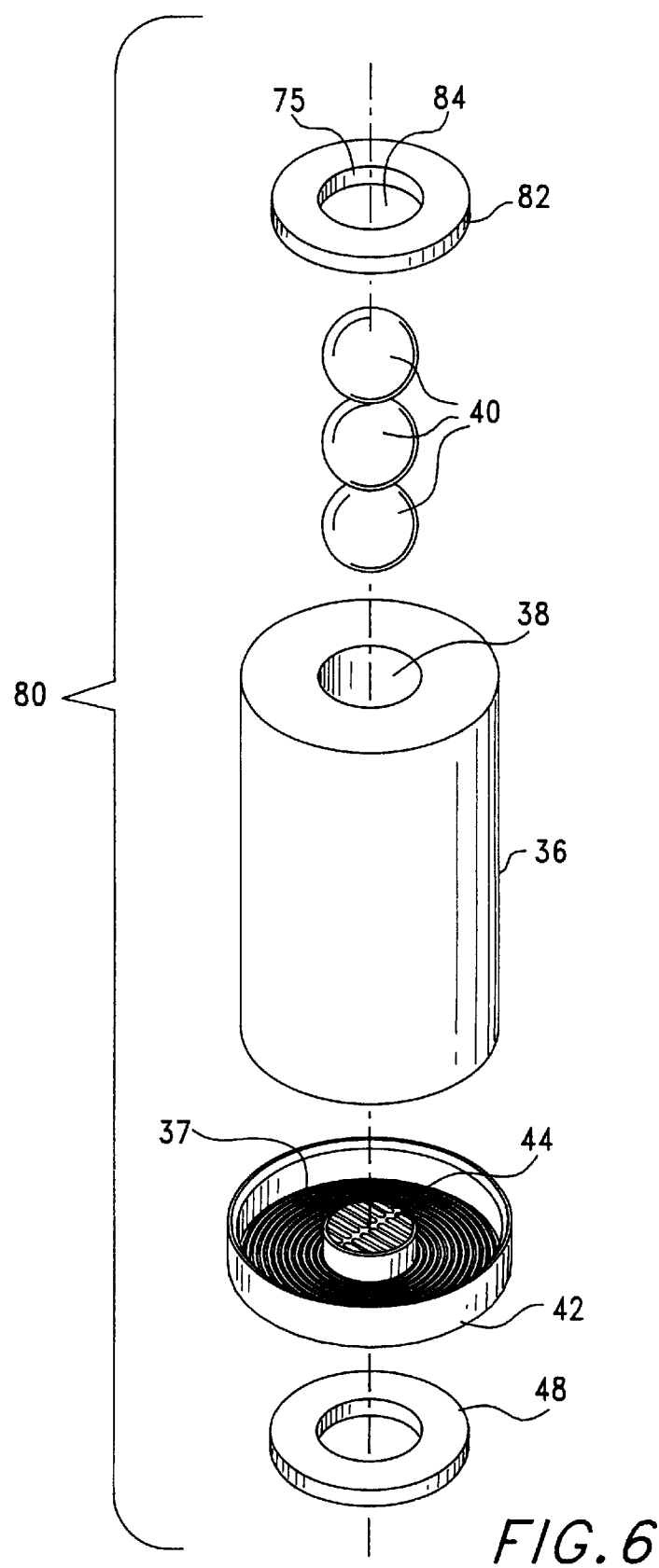
FIG. 6 is an expanded perspective view of the unidirectional filter cartridge of the embodiment of FIG. 5.

One embodiment of a unidirectional filter cartridge of this invention is illustrated in FIGS. 5 and 6. As shown in FIG. 5, unidirectional filter cartridge 80 may be contained within housing 12 of filter unit 70. As shown in FIGS. 5 and 6, unidirectional filter cartridge 80 comprises carbon block 36 for removing chlorine from tap water and having a central bore 38 for receiving scale-inhibitor spheres 40 as described above. Carbon block 36 of unidirectional filter unit 80 may alternatively comprise a modified carbon block material described above for trapping fine sediment in tap water in addition to removing chlorine or the carbon block may further comprise an outer sleeve wrapped around the exterior carbon block comprising a depth filtration material as described above. As shown to best advantage in FIG. 6, scale inhibitor spheres 40 are retained in central bore 38 by closed upper end cap 82 and lower aperatured end cap 42. Preferably, aperatured end cap 42 has grates 44 or other perforations as described above that allow the water to flow out of filter cartridge 80 but that retain the scale-inhibitor spheres 40. The flow of water through unidirectional filter cartridge 80 is as described above, that is, water entering filter unit 70 flows radially through carbon block 36 of filter cartridge 80, and then the de-chlorinated water flow into the center bore 38 of carbon block 36 where the de-chlorinated water encounters scale-inhibitor spheres 40. After contact with the spheres 40, the water is directed though aperatured end cap 42. Since unidirectional filter cartridge comprises only one aperatured end cap 42, unidirectional filter cartridge 80 must be installed within housing body 30 of filter unit 70 such that the aperatured lower end cap 42 is near the outlet port of housing 12, that is, end cap 42 is positioned in filter unit 70 such that guide 63 of lower portion 62 is received in recessed portion 44 of end cap 42. Filter unit 70 illustrated in FIG. 5 further comprises "knife edges" 46 which extend axially from the interior of lower portion 62 and which compress into a soft rubber washer 48 affixed to aperatured end cap 42 for sealing aperatured end cap 42 to the interior of housing body 30. Aperatured end cap 42 may include concentric ribs 37 for contacting and sealing with the carbon block 36.

Preferably, unidirectional filter cartridge 80 and housing 12 of filter unit 70 are designed so that placement of unidirectional filter cartridge 80 is made easy and sure. For example, guide 73 of upper portion 60 may be sized and/or shaped differently than guide 63, and consequently recessed portion 75 of closed end cap 82 would be similarly sized and/or shaped differently than recessed portion 65 of aperatured end cap 42, such that guide 73 can only be received in recessed portion 75 but cannot be received in recessed portion 65, and likewise guide 63 can only be received in recessed portion 65 but cannot be received in recessed portion 75. Other methods, such as color-coding one or both end caps may be employed to enable the user to correctly install unidirectional filter cartridge 80.

Figure 7:
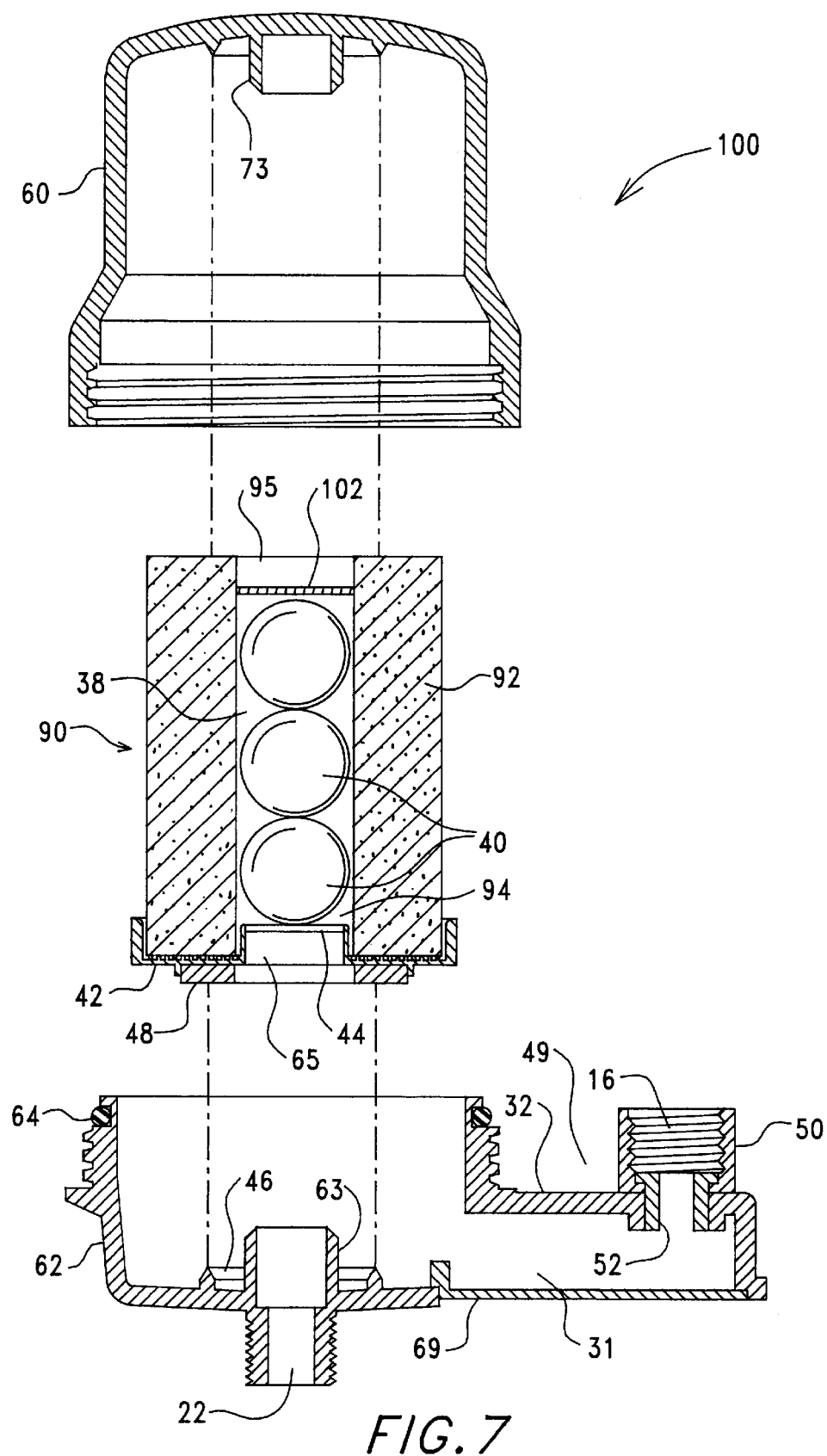
FIG. 7 is an expanded side view of a cross-sectional view of the invented filter unit, comprising a unidirectional filter cartridge comprising a carbon block having a closed upper end.
Figure 8:
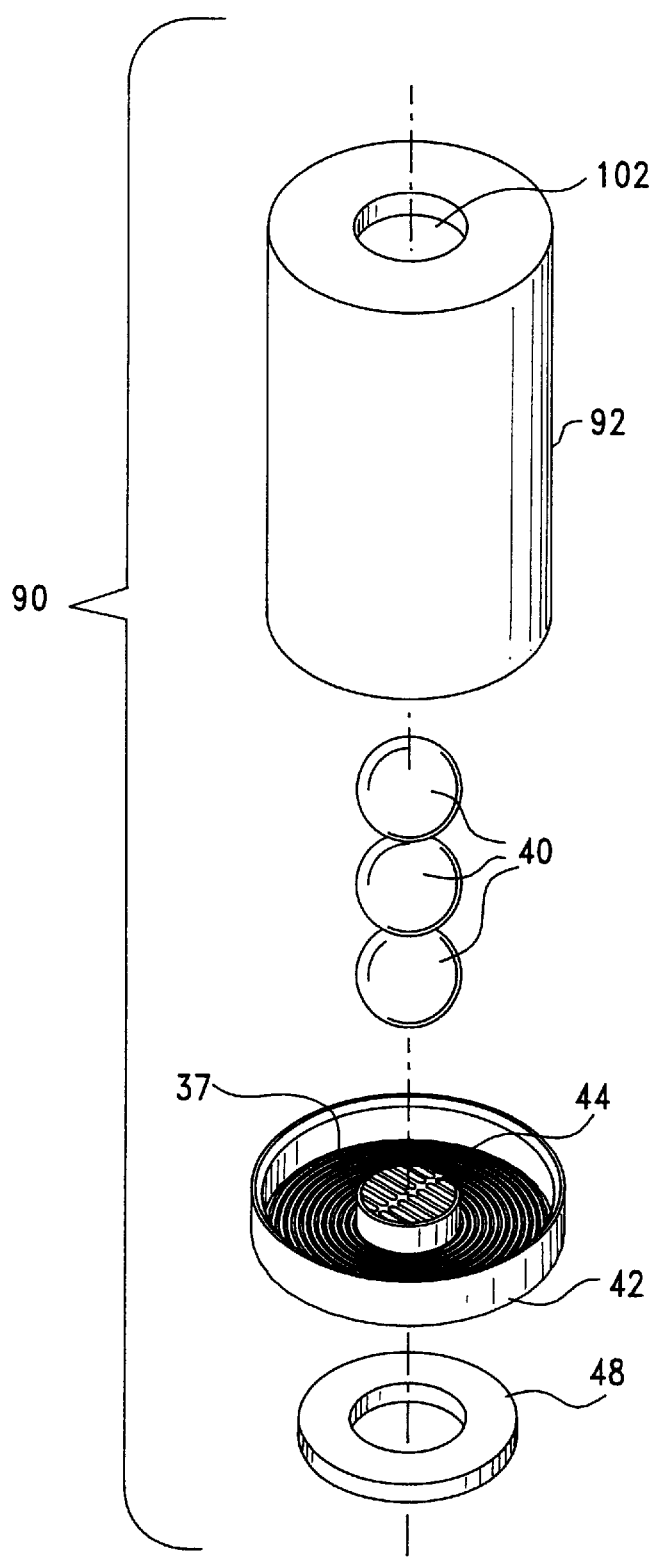
FIG. 8 is an expanded perspective view of the unidirectional filter cartridge of the embodiment of FIG. 7.

Yet another embodiment of a unidirectional filter cartridge of this invention is illustrated in FIGS. 7 and 8. As shown in FIG. 7, unidirectional filter cartridge 90 is contained within housing 12 of filter unit 100. As shown in FIGS. 7 and 8, unidirectional filter cartridge 90 comprises carbon block 92 for removing chlorine from tap water and having a central bore 38 for receiving scale-inhibitor spheres 40 as described above. Carbon block 92 of unidirectional filter unit 80 alternatively comprise a modified carbon block material described above for trapping fine sediment in tap water in addition to removing chlorine, or the carbon block may further comprise an outer sleeve wrapped around the exterior carbon block comprising a depth filtration material as described above. As shown to best advantage in FIG. 8, unidirectional filter cartridge 90 comprises carbon block 92 which may be generally cylindrically shaped and which has a closed end 102 with recessed portion 95 and an opened end 94. Carbon block 92 further comprises a central bore 38. Carbon block 92 may be fabricated, for example, by molding a composite of carbon and a thermoplastic material such as polyethylene by methods known to those of skill in the art. Scale inhibitor spheres 40 are retained in central bore 38 by closed upper end 102 of carbon block 92 and lower aperatured end cap 42 which is affixed to opened end 94 of carbon block 92. Preferably, aperatured end cap 42 has grates 44 or other perforations as described above that allow the water to flow out of filter cartridge 90 but that retain the scale-inhibitor spheres 40. Since carbon block 92 is fabricated to have a completely closed end 102, it is not necessary to place an end cap on closed end 102 of carbon block 92. The flow of water through unidirectional filter cartridge 90 is as described above, that is, water entering filter unit 100 flows radially through carbon block 92 of filter cartridge 90, and then the de-chlorinated water flow into the center bore 38 of carbon block 92 where the de-chlorinated water encounters scale-inhibitor spheres 40. After contact with the spheres 40, the water is directed though aperatured end cap 42. Since unidirectional filter cartridge comprises only one aperatured end cap 42, unidirectional filter cartridge 90 must be installed within housing body 30 of filter unit 100 such that the aperatured lower end cap 42 is in the downward position, that is, end cap 42 is positioned in filter unit 100 such that guide 63 of lower portion 62 is received in recessed portion 44 of end cap 42. Filter unit 100 illustrated in FIG. 7 further comprises "knife edges" 46 which extend axially from the interior of lower portion 62 and which compress into a soft rubber washer 48 affixed to aperatured end cap 42 for sealing aperatured end cap 42 to the interior of housing body 30. Aperatured end cap 42 may include concentric ribs 37 for contacting and sealing with the carbon block 36. Preferably, unidirectional filter cartridge 90 and housing 12 of filter unit 100 are designed so that placement of unidirectional filter cartridge 90 is made easy and sure, such as by the methods described above for the correct installation of unidirectional filter cartridge 80 in filter unit 70.

Outside the United States, most bathrooms do not feature a plumbing fixture, located six feet from the floor, to which a showerhead is attached. Europeans and Asians, as well as most Canadians, prefer a hand-held showerhead device. The plumbing port for the hand-held device is located just under the bathroom tub's faucet. A long flexible tube is connected to this threaded port and runs vertically up to a bracket that is mounted on the shower wall approximately in the same place U.S. plumbing places its plumbing connection. This bracket is designed to hold a hand-held style showerhead. Thus, the European bather can use the showerhead in a hands-free style or can remove the showerhead from its bracket and rinse from various directions while holding the showerhead with one hand.

The ability to accommodate both U.S. and European-style shower accessory markets is important. Today, global distribution is becoming increasingly important as free trade zones are created and trade barriers are removed. Universality in the invented device is accomplished by making arm 32 of the filter unit 10 (FIG. 2), filter unit 70 (FIG. 5), and filter unit 100 (FIG. 7) long enough to reach under the European-style bath faucet. Arm 32 is therefore preferably long enough to provide a space 49 between the inlet port 16 and the side of the housing body 30 that is about 1–2 inches wide. A shorter arm 32 would be appropriate only for the U.S. market, but would cause the filter body 30 to obstruct the reach of the arm for European-style tub faucets. By elongating the arm 32 beyond the minimum needed for the U.S. market, filter units 10, 70 and 100 are adapted for use with both plumbing configurations without the need for other changes in the design of filter units 10, 70 or 100.

The inlet port 16 and outlet port 22 of filter units 10, 70 and 100 may accommodate a variety of connectors, and may be easily adapted for variations in the threaded connections used in the U.S. and European-style shower/tub plumbing. Preferably, filter units 10, 70 and 100 may be sold as a do-it-yourself kit, with the inlet port 16 and outlet port 22 threads formed at the time of molding or assembly for the particular market. Alternatively, adapters, couplers, or showerheads may be included in the kits to custom-fit the filter unit to the particular plumbing with little or no changes to the filter unit 10 itself.

In the U.S., the inlet port 16 preferably comprises a collar or nut 50 that rotates on a post 52 that is sonically welded or otherwise secured to the arm 32. During installation, the showerhead 20 is removed from its normal place on the pipe 18, and the nut 50 is screwed onto the pipe 18 until the end of post 52 meets and preferably seals with the pipe end 54. Thread tape may be used to further seal this connection. The swivel connector 24 of the user's showerhead 20 is then screwed onto the threaded male outlet port 22 of filter units 10, 70 and 100. Thus, filter unit 10, 70 or 100 is rigid and fixed relative to the pipe 18, but the showerhead 20 may swivel relative to the filter unit.

In the European configuration (not shown), the inlet port 16 of filter unit 10 is rigidly connected to the tub faucet. The flexible tubing for the hand-held unit, which normally would be attached to the bottom of the tub faucet, is instead attached to the bottom of filter unit 10 at the outlet port 22. Variances in pipe threads between countries can be changed at the point of molding the shower filter unit. This may be accomplished by using an insert (in the case of the outlet port), or by changing the collar 50 (in the case of the inlet port). It can also be converted using a brass coupler that changes one thread configuration to another.

The expansion and contraction of the filter housing 30 of filter units 10, 70 and 100 with hot water will, over time, cause the threads to become difficult to rotate, making it difficult to remove the upper sump 60 for filter cartridge change-outs. To solve this problem, the invented design incorporates four wings 66 (FIG. 1) spaced radially around the outside of the upper sump 60. These protruding wings 66 make the upper sump 60 easy to grasp and to rotate during filter changes, thereby eliminating the need for a special tool.

Flow rate is an important issue in the global distribution of water filters because different geographic regions are accustomed to water pressures which range from 20 PSI to 125 PSI. In the United States and Japan, for example, water pressure can be very high. In Mexico and most of Asian, the water pressure is lower. To accommodate these differing water pressures, the mesh size of the powdered carbon used to fabricate carbon block 36 can be changed according to the desired result. A finer mesh size will inhibit the passage of water by causing higher pressure-drop. A coarser mesh size will allow water to flow more easily. To provide appropriate filter cartridges 14 and 80 for the various water pressures, this invented filter design may include changing the mesh size of the raw carbon powder in the manufacture of carbon block 36. Each gradation is color-coded so that one color can be designated for high pressure (80 to 125), medium pressure (40 to 80), and low pressure (15 to 40).

The preferred filter housing 30 is made of molded plastic, preferably ABS, or other durable material. The arm 322 may include a separately-molded plastic lid 69. This lid 69 may be sonically welded or otherwise sealed to the arm 32 to enclose the arm interior space. The inlet port nut 50 may be metal or plastic, as may be other connectors or couplers that may be desirable for adaptation to various plumbing designs. Conventional techniques may be used for attaching the various components of the invention together, for example, sonic welding, press-fitting, and threading to connect the filter unit components together, or adhesive to connect the filter cartridge components together.

While the filter cartridges of this invention have been illustrated as being installed in filter units having both the inlet and outlet ports positioned near the lower end of the body of the filter unit, it is to be understood that the filter cartridges of this invention may be installed in filter units having alternative designs. For example, the filter cartridges of this invention may be installed in filter units having an inlet port at the upper end of the body and an outlet port at the lower end of the body. In this instance, the filter unit is threaded onto a plumbing pipe at the inlet end and to a showerhead at the outlet end, such that the filter unit is positioned in line with the plumbing. When installing a unidirectional filter cartridge of this invention in such an "in-line" filter unit, it is necessary to install the unidirectional filter cartridge with the opened end of the unidirectional filter cartridge near the outlet port of the filter unit.

The foregoing description is considered as illustrative only of the principles of the invention. The words "comprise," "comprising," "include," "including," and "includes" when used in this specification and in the following claims are intended to specify the presence of stated features, integers, components, or steps, but they do not preclude the presence or addition of one or more other features, integers, components, steps, or groups thereof. Furthermore, since a number modifications and changes will readily occur to those skilled in the art, it is not desired to limit the invention to the exact construction and process shown described above. Accordingly, all suitable modifications and equivalents may be resorted to falling within the scope of the invention as defined by the claims which follow.

What is claimed is:

1. A filter unit for attachment to a bathroom water source and for use with a filter cartridge and a spraying device, the filter unit comprising:
    a housing having a body with an interior space for receiving a filter cartridge and having an upper end and a lower end;
    a unidirectional, vertically oriented filter cartridge received in said housing body interior space, said filter cartridge comprising a carbon filter media for removal of chlorine from the water and a scale inhibitor media for treating scale-forming components in the water, said filter cartridge having an upper closed end and an lower opened end, said opened end of said unidirectional filter cartridge disposed at the body lower end;
    said housing further having a generally horizontal arm extending from said housing body;
    said housing further having an arm interior space in fluid communication with said body interior space;
    said housing further having an inlet port in fluid communication with the arm interior space, wherein the housing inlet port is adapted for attachment to the bathroom water source; and
    said housing further having an outlet port through the body lower end in fluid communication with the interior space of the body, wherein the housing outlet port is adapted for attachment to a spraying device.

2. The filter unit of claim 1, wherein carbon filter media comprises a carbon block.

3. The filter unit of claim 2, wherein said filter cartridge carbon block is generally cylindrical and has a central bore for receiving said scale-inhibitor media.

4. The filter unit of claim 3, wherein said scale-inhibitor media comprises hexametaphosphate/silicate spheres or hexametaphosphate crystals.

5. The filter unit of claim 3, wherein said closed end of said filter cartridge comprises a closed end cap affixed to said upper end of said carbon block.

6. The filter unit of claim 3, wherein said carbon block has a central space for receiving the scale-inhibitor media.

7. The filter unit of claim 1, wherein said opened end comprises an aperatured end cap affixed to said open end of said filter cartridge for allowing water flow through said opened end cap, said opened end cap further sealing to the body inner surface for preventing water flow from bypassing said carbon block.

8. The filter unit of claim 1, wherein said carbon filter media is fabricated into a carbon block having a closed end and an opened end opposite said closed end.

9. The filter cartridge of claim 8, wherein the carbon block is generally cylindrical and has a longitudinal central core between said closed end and said opened end for receiving the scale-inhibitor media.

10. The filter cartridge of claim 8, further comprising an aperatured end cap affixed to said opened end of said carbon block.

11. The filter cartridge of claims 2 or 8, wherein said carbon block comprises fibrous material for trapping fine sediment.

12. The filter cartridge of claims 2 or 8, wherein the carbon block further comprises an outer sleeve of depth filtration material.

13. The filter cartridge of claim 12, wherein said depth filtration material is spun polypropylene or porous plastic.

14. The filter unit of claim 1, wherein said horizontal arm extends from near the lower end of said housing body, so that said housing is located substantially above the water source.

* * * * *